United States Patent
Hyde et al.

(10) Patent No.: US 10,114,461 B2
(45) Date of Patent: *Oct. 30, 2018

(54) TACTILE CONTROL SYSTEM

(71) Applicant: Elwha LLC, Bellevue, WA (US)

(72) Inventors: Roderick A. Hyde, Redmond, WA (US); Jordin T. Kare, San Jose, CA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/701,954

(22) Filed: Sep. 12, 2017

(65) Prior Publication Data

US 2018/0004296 A1     Jan. 4, 2018

Related U.S. Application Data

(63) Continuation of application No. 14/530,098, filed on Oct. 31, 2014, now Pat. No. 9,791,929.

(51) Int. Cl.
| | |
|---|---|
| *G08B 6/00* | (2006.01) |
| *G09B 21/00* | (2006.01) |
| *H04B 3/36* | (2006.01) |
| *G06F 3/01* | (2006.01) |

(52) U.S. Cl.
CPC ................... *G06F 3/016* (2013.01)

(58) Field of Classification Search
CPC ........ G06F 3/016; G06F 3/041; G06F 3/0488; G06F 2203/04809; G08B 6/00

USPC .................... 340/407.1, 407.2; 345/156–184
See application file for complete search history.

(56) References Cited

U.S. PATENT DOCUMENTS

| | | | |
|---|---|---|---|
| 7,830,363 B2 * | 11/2010 | Chiang ................. | G06F 1/1628 345/158 |
| 7,858,891 B2 | 12/2010 | Strohband et al. | |
| 8,493,354 B1 * | 7/2013 | Birnbaum ............... | G06F 3/016 340/407.2 |
| 8,780,060 B2 | 7/2014 | Maschmeyer et al. | |
| 8,847,741 B2 * | 9/2014 | Birnbaum ............... | G06F 3/016 340/407.1 |
| 2003/0151589 A1 * | 8/2003 | Bensen ................. | G06F 3/0414 345/156 |
| 2006/0036335 A1 * | 2/2006 | Banter ................... | B60K 35/00 700/17 |
| 2007/0236450 A1 * | 10/2007 | Colgate .................. | G06F 3/016 345/156 |
| 2007/0247420 A1 * | 10/2007 | Strohband .............. | H01H 13/84 345/156 |
| 2009/0066672 A1 * | 3/2009 | Tanabe .................. | G06F 1/1626 345/176 |
| 2009/0128503 A1 * | 5/2009 | Grant ...................... | G06F 3/016 345/173 |

(Continued)

*Primary Examiner* — Hoi Lau
(74) *Attorney, Agent, or Firm* — Foley & Lardner LLP

(57) ABSTRACT

A tactile control system includes a control member configurable between a plurality of physical configurations and configured to receive manual input from a user. The tactile control system also includes a transducer coupled to the control member and configured to generate a signal based on the manual input from the user, and an actuator coupled to the transducer and the control member and configured to change the physical configuration of the control member based on the signal.

28 Claims, 6 Drawing Sheets

(56) References Cited

U.S. PATENT DOCUMENTS

| | | | |
|---|---|---|---|
| 2009/0302172 A1* | 12/2009 | Suddreth | B64C 13/04 244/236 |
| 2010/0053078 A1* | 3/2010 | Kim | G06F 3/016 345/156 |
| 2010/0079403 A1* | 4/2010 | Lynch | G06F 3/0202 345/174 |
| 2010/0141407 A1* | 6/2010 | Heubel | G06F 1/163 340/407.1 |
| 2010/0162109 A1* | 6/2010 | Chatterjee | G06F 3/016 715/702 |
| 2010/0171720 A1* | 7/2010 | Craig | G06F 3/0202 345/173 |
| 2010/0177050 A1* | 7/2010 | Heubel | G06F 3/016 345/173 |
| 2011/0157080 A1* | 6/2011 | Ciesla | G06F 3/0202 345/174 |
| 2011/0254672 A1* | 10/2011 | Ciesla | G06F 3/016 340/407.2 |
| 2012/0032886 A1* | 2/2012 | Ciesla | G06F 3/016 345/168 |
| 2012/0098789 A1* | 4/2012 | Ciesla | G06F 3/044 345/174 |
| 2012/0105333 A1* | 5/2012 | Maschmeyer | G06F 3/016 345/173 |
| 2012/0162073 A1* | 6/2012 | Kryze | G06F 1/266 345/158 |
| 2012/0235935 A1* | 9/2012 | Ciesla | G06F 3/0202 345/173 |
| 2012/0241312 A1* | 9/2012 | Keefe | B29C 59/02 204/242 |
| 2012/0286944 A1* | 11/2012 | Forutanpour | G06F 3/016 340/407.1 |
| 2012/0313768 A1* | 12/2012 | Campbell | B60R 25/2009 340/438 |
| 2013/0065587 A1* | 3/2013 | Hong | H04W 48/18 455/435.2 |
| 2013/0081933 A1* | 4/2013 | Browne | G05G 1/02 200/402 |
| 2013/0265560 A1* | 10/2013 | Dinger | G03F 7/70058 355/67 |
| 2013/0278484 A1* | 10/2013 | Hwang | G06F 3/1423 345/2.3 |
| 2013/0279795 A1* | 10/2013 | Shlain | G06T 7/0004 382/149 |
| 2013/0329978 A1* | 12/2013 | McDermott | G06T 15/08 382/131 |
| 2014/0035736 A1* | 2/2014 | Weddle | G05D 1/005 340/407.2 |
| 2014/0184497 A1 | 7/2014 | Birnbaum et al. | |
| 2014/0257567 A1* | 9/2014 | Jolda | B60K 35/00 700/275 |
| 2014/0267065 A1* | 9/2014 | Levesque | G06F 3/016 345/173 |
| 2014/0274398 A1* | 9/2014 | Grant | G06F 3/0338 463/37 |
| 2014/0320276 A1 | 10/2014 | Maschmeyer et al. | |
| 2014/0320436 A1* | 10/2014 | Modarres | G06F 3/0412 345/173 |
| 2015/0029123 A1* | 1/2015 | Ciesla | G06F 3/04886 345/173 |
| 2015/0035780 A1 | 2/2015 | Birnbaum et al. | |
| 2015/0077364 A1* | 3/2015 | Parthasarathy | G06F 3/016 345/173 |
| 2015/0077398 A1* | 3/2015 | Yairi | G06F 3/016 345/175 |
| 2015/0133221 A1* | 5/2015 | Danny | A63F 13/92 463/37 |
| 2015/0277562 A1* | 10/2015 | Bard | G06F 3/016 345/177 |
| 2016/0124510 A1* | 5/2016 | Hyde | G06F 3/016 340/407.2 |

* cited by examiner

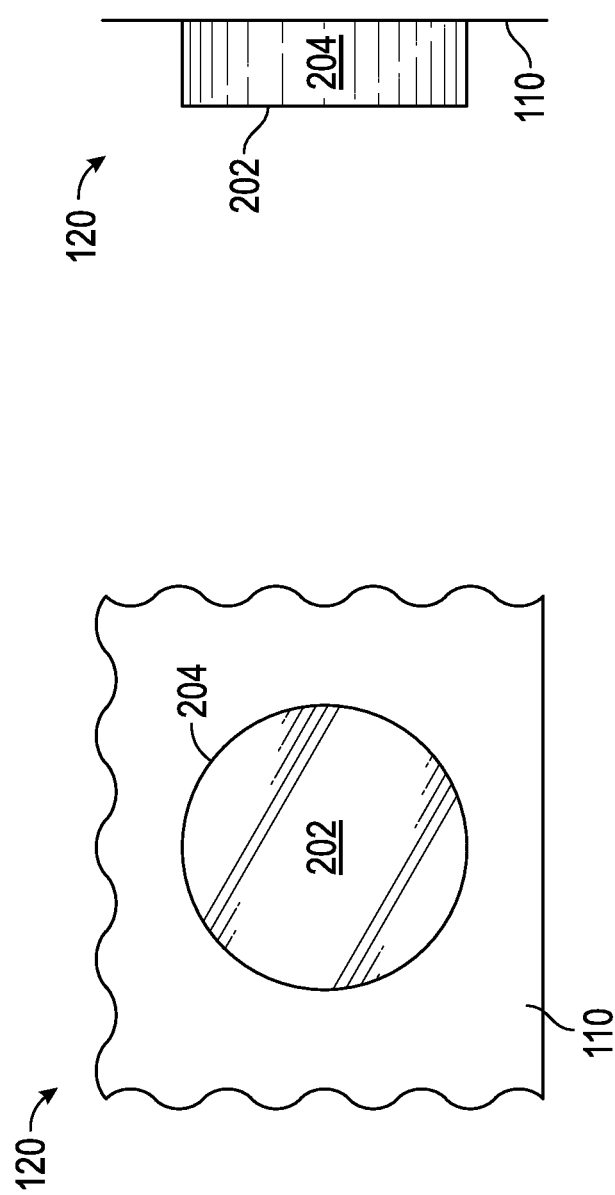

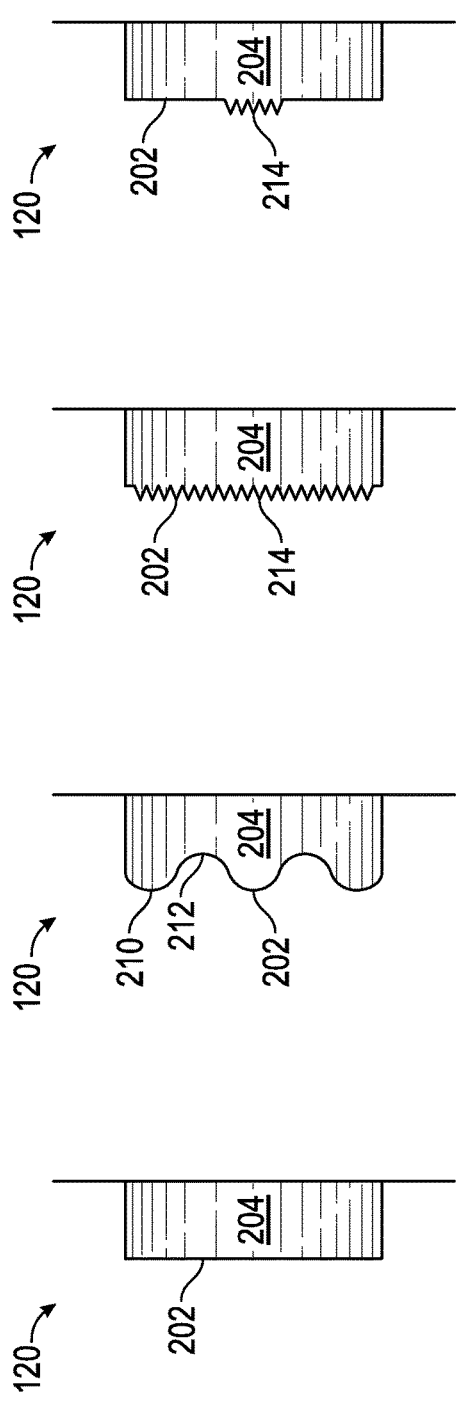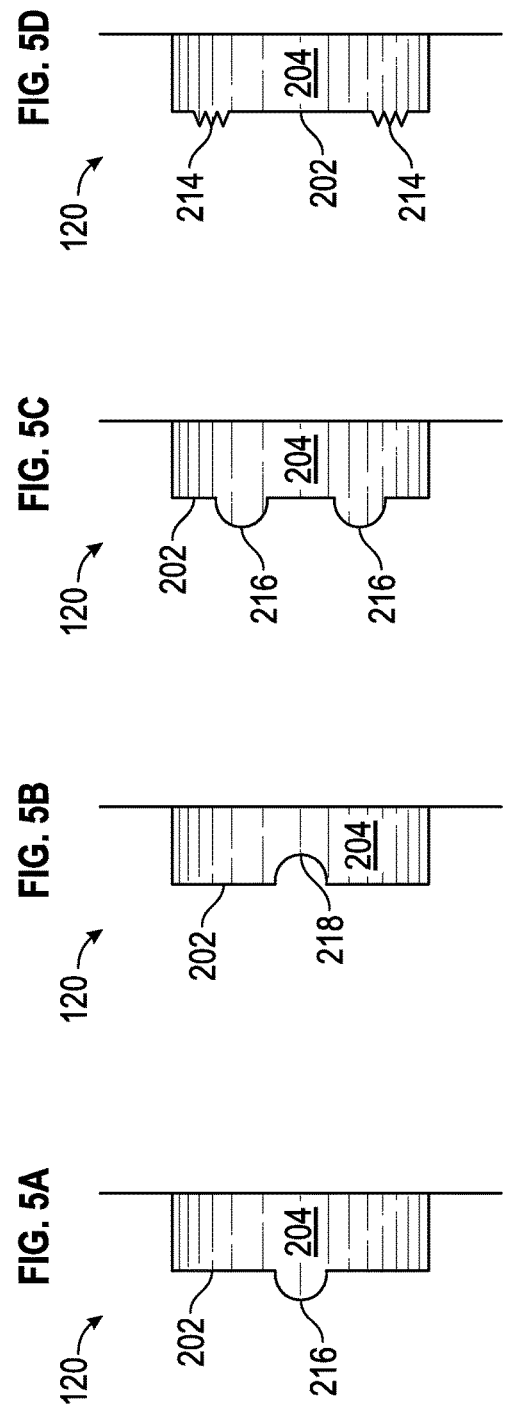

TACTILE CONTROL SYSTEM

CROSS-REFERENCE TO RELATED PATENT APPLICATIONS

This application is a Continuation of U.S. patent application Ser. No. 14/530,098, filed Oct. 31, 2014, the entire disclosure of which is hereby incorporated by reference herein.

BACKGROUND

Control systems may utilize a single set of controls for controlling more than one device, function, or condition. Control systems for vehicles, for example, often include a multi-function display screen and a single set of controls for controlling a plurality of different vehicle systems or devices. For instance, a single set of controls may control an audio system, a heating and cooling system, a navigation system, a telecommunications system, an emergency response system, and the like. While driving, it may be difficult for a user of the vehicle control system to read and interpret the multi-function display screen or manipulate one or more controls without looking away from the road. As a result, the user may be unable to quickly manipulate the controls as may be desirable.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

An embodiment of the present disclosure relates to a control device. The control device includes a control member configurable between a plurality of shapes and configured to receive manual input from a user, a transducer coupled to the control member and configured to generate a signal based on the manual input from the user, and an actuator coupled to the transducer and the control member and configured to change the shape of the control member based on the signal.

Another embodiment of the present disclosure relates to a control device. The control device includes a control member having a surface configurable between a plurality of different surface textures and configured to receive manual input from a user, a transducer coupled to the control member and configured to generate a signal based on the manual input from the user, and an actuator coupled to the transducer and the control member and configured to change the surface texture of the control member based on the signal.

Another embodiment of the present disclosure relates to a control system. The control system includes a control member having a plurality of physical configurations and being configured to receive manual input from a user, and a controller coupled to the control member and configured to control the physical configuration of the control member based on the manual input from the user, wherein the physical configuration of the control member is configured to provide a tactile indication of a current state of the control system.

Another embodiment of the present disclosure relates to a method for providing a tactile indication of a variable state of a control member. The method includes providing a control member having a plurality of physical configurations and being configured to receive manual input from a user, receiving, by a controller, a signal based on the manual input, and changing, by the controller, the physical configuration of the control member based on the signal, wherein the physical configuration of the control member provides a tactile indication of the variable state associated with the control member.

BRIEF DESCRIPTION OF THE FIGURES

FIG. 2A is a front view illustration of a control member, according to one embodiment.

FIG. 2B is a side view illustration of the control member of FIG. 2A.

FIGS. 5A-5H are side view illustrations of a control member having a changeable physical configuration, including a changeable tactile surface, according to various embodiments.

DETAILED DESCRIPTION

Figure 1:
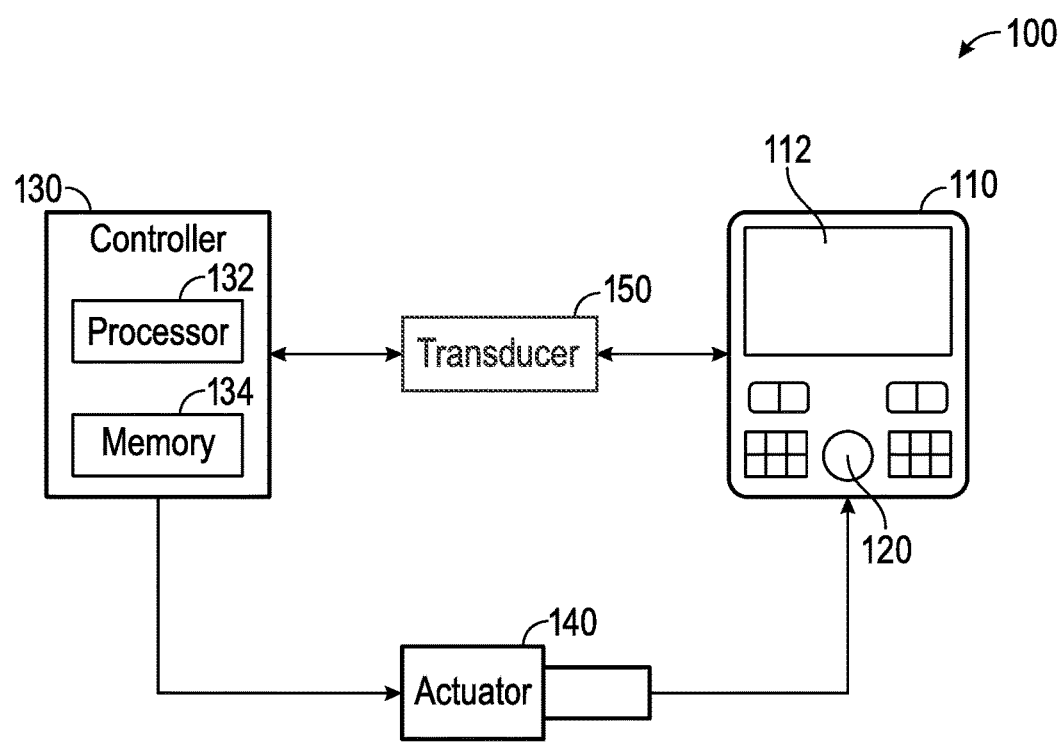
FIG. 1 is a block diagram of a control system, including a control member having a changeable physical configuration, according to one embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Referring to FIG. 1, tactile control system 100 is shown, according to one embodiment. Control system 100 may be used to control one or more systems or conditions within a particular control environment. For instance, control system 100 may be used to control various subsystems (e.g., audio system, heating and cooling system, navigation system, emergency response system, communication system, etc.) of a vehicle (e.g., an automobile, an aircraft, a train, etc.), including conditions such as radio volume, air temperature, navigation settings, etc.

Tactile control system 100 includes manipulatable controls such as control member 120, which may be a button, knob, lever, switch, handle, joystick, graspable control member, or other similar component. Control member 120 may also include more than one control components which may be collectively housed or otherwise included within a housing such as control panel 110. Control member 120 may be manipulated (e.g., turned, pressed, actuated, slid, squeezed, pulled, etc.) by a user of tactile control system 100 to change a variable state of control system 100, such as to control one or more conditions related to tactile control system 100. The variable state of control system 100 may be based on a current device or system (e.g., subsystem), or a current system parameter, that is being controlled via control member 120. For instance, when control system 100 is used to control a system of an automobile, the variable state may be modified via control member 120 to control an audio system, a heating and cooling system, a navigation system, or the like. When an audio system is selected, for example, the variable state may indicate a current volume, a selected audio source, or a song selection. The user of control system 100 may be able to control the variable state of control system 100 via the controls (e.g., control member 120).

Control member 120 may have a changeable physical configuration (e.g., shape, texture, etc.). In one embodiment, for instance, control member 120 is changeable between a plurality of physical configurations based on a variable state of control member 120 or control system 100. The physical configuration of control member 120 may be tactilely identifiable to the user. For instance, control member 120 may have a three-dimensional shape that is graspable (i.e., configured to be grasped, such as by a user of system 100) by the user to identify the particular shape. The physical configuration of control member 120 may change between two or more identifiable shapes (e.g., a cube, a cylinder, a rectangular prism, etc.) based on a change in state of control system 100. The changeable physical configuration of control member 120 may allow the user to tactilely determine the variable state of control system 100 based on the identified shape of control member 120. For instance, control member 120 may be used to control more than one condition (e.g., volume, power, etc.) of control system 100. The user may need to identify the current state of control system 100 in order to control a particular condition of system 100.

Control system 100 may also include actuator 140. Actuator 140 may be coupled to or otherwise integrated with control member 120 and configured to change the physical configuration of control member 120. For instance, actuator 140 may be a hydraulic cylinder or other mechanical actuator configured to manipulate control member 120 in order to change the physical configuration. Actuator 140 may also be configured to change the physical configuration of control member 120 by applying a stimulus to control member 120. For instance, control member 120 may include a shape change material configured to change shape in response to the application of a stimulus (e.g., pressure, temperature, moisture, pH level, an electric field, a magnetic field, etc.) by actuator 140. Actuator 140 may be configured to selectively apply the stimulus to change the physical configuration of control member 120 as desired. Actuator 140 may be configured to change the physical configuration of control member 120 using an electrical, hydraulic, pneumatic, and/or thermal stimulus.

Control system 100 may also include controller 130. Control member 120 may be configured to communicate with controller 130. In one embodiment, controller 130 is configured to interpret the manual user input received via control member 120. Controller 130 may then control one or more conditions of control system 100 based on the manual user input received via control member 120 (e.g., based on the current state of control member 120 or control system 100). Controller 130 may also be used to control display screen 112, which may be included as part of control panel 110. Display screen 112 may be configured to display information related to the variable control state and other information sent by controller 130. Display screen 112 may also receive input from the user via touchscreen controls.

Controller 130 may also be configured to control the physical configuration of control member 120 based on the current state of control member 120, or otherwise based on the manual user input. In one embodiment, controller 130 is coupled to or otherwise configured to communicate with actuator 140. In this embodiment, controller 130 may be configured to send a signal to actuator 140 in order to control actuator 140. Actuator 140 may be configured to receive the signal and change the physical configuration of control member 120 and/or other controls based on the signal. For instance, controller 130 may send a signal to actuator 140 when a state of control member 120 is changed, directing actuator 140 to change the physical configuration of control member 120 in order to provide a tactile indication of the variable state of control system 100 (e.g., control member 120).

Control system 100 may also include transducer 150. In one embodiment, transducer 150 is coupled to control member 120 and configured to generate a signal based on the manual input received from the user via control member 120. Transducer 150 may send the signal to controller 130 for interpretation by controller 130 in order to control the components of control system 100. In another embodiment, transducer 150 is coupled to actuator 140 and configured to send the generated signals to actuator 140. Actuator 140 may then change the physical configuration of control member based on the signals received from transducer 150. Transducer 150 may be a sensor or detector configured to interpret the manual input from the user. In one embodiment, transducer 150 may be a combination transducer configured to both detect the input and create an action. In this embodiment, transducer 150 may be configured to detect the manual user input and cause control member 120 to change physical configuration based on the manual user input.

Referring now to FIGS. 2A and 2B, control member 120 is shown, according to one embodiment. In this embodiment, control member 120 is able to be grasped by a user of control system 100. Control member 120 is configured to control one or more of a plurality of conditions of control system 100 based on manipulation by a user of control system 100 and the current state of control member 120. In this embodiment, control member 120 includes a front face or surface 202 and perimeter surface 204. Surface 202 is substantially flat and configured to face a user of system 100. Surface 204 is positioned substantially perpendicular to surface 202 and is positioned around an outer edge of surface 202. The user may grasp surface 204 to turn control member 120, press surface 202 to actuate control member 120, or otherwise manipulate control member 120, including touching surface 202 and/or surface 204, in order to deliver input to control various system conditions. In other embodiments, control member 120 may include other surfaces that are otherwise positioned to be touched or manipulated by a user. In one embodiment, control member 120 sends signals to controller 130 based on user manipulation of control member 120. Controller 130 receives and interprets the signals and controls or modulates one or more system conditions based on the current state of control member 120.

Control member 120 has a physical configuration (e.g., shape, texture, etc.) that is changeable or variable based on a current state. The physical configuration may include a shape of control member 120, a texture of one of the surfaces of control member 120 (e.g., surface 202, surface 204, etc.), or any other physical conditions or characteristics of control member 120. The physical configuration may include a configuration of surfaces 202 and 204, including any physical conditions or characteristics of surfaces 202 and 204. The physical configuration of control member 120 is intended to provide a tactile indication of a current state of control member 120 such that the user is able to determine the current state of control member 120 without looking at control member 120 or control panel 110. For instance, a user of control system 100 may be able to blindly determine the current state of control member 120 based on an identifiable (e.g., by touch) shape or texture of control member 120.

Figure 3B:
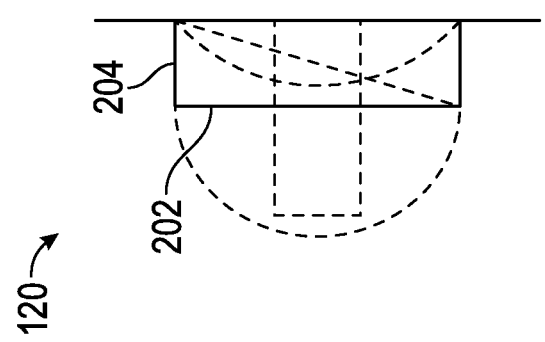
FIG. 3B is a side view illustration of the control member of FIG. 3B.
Figure 3A:
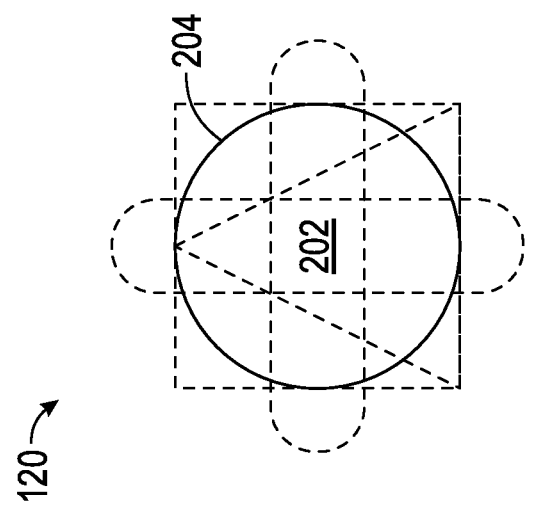
FIG. 3A is front view illustration of a control member having a changeable physical configuration, according to various embodiments.

Referring now to FIGS. 3A and 3B, the physical configuration of control member 120 may be changeable to change a shape or geometry of control member 120. The shape of control member 120 is intended to provide a tactile indication of a current state of control member 120 (e.g., the tactile indication is a general or overall shape of control member 120). For instance, control member 120 may be changeable between two or more identifiable three-dimensional shapes to provide a tactile indication of the current state. Referring to FIGS. 3A and 3B, control member 120 may be changeable between two or more three-dimensional geometric shapes (e.g., a cube, a cylinder, a sphere, a rectangular prism, a cone, a pyramid, etc.). In FIGS. 3A and 3B, the changeable shape of control member 120 is designated by dashed lines. The geometric shapes may be identifiable to a user of system 100 and provide a tactile indication of the variable state. In this embodiment, a configuration or shape of surfaces 202 and/or 204 may be changed between two or more geometric shapes (e.g., a square, a circle, an oval, a triangle, a rectangle, etc.) in order to convey a desired shape of control member 120.

Figure 4:
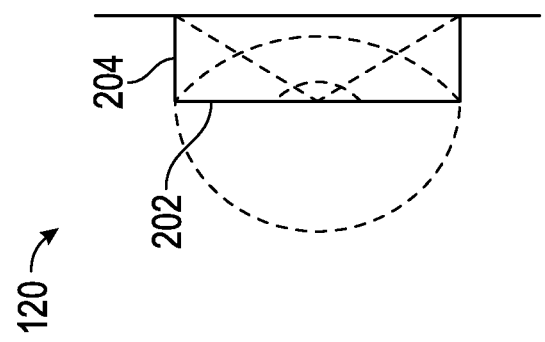
FIG. 4 is an illustration of a control member having a changeable physical configuration, according to various embodiments.

Referring to FIG. 4, control member 120 may also be changeable between two or more of a substantially flat shape, a concave shape, a convex shape, and a rounded shape. In FIG. 4, the changeable shape of control member 120 is again designated by dashed lines, according to one embodiment. In this embodiment, surface 202 is changeable between a substantially flat shape and various convex and concave shapes (e.g., a rounded shape, a pointed shape, etc.) to change the shape of control member 120. In other embodiments, surface 204 and/or any other tactile surfaces of control member 120 may be similarly changeable. The shape of surfaces 202 and 204 may be tactilely identifiable to a user of system 100 and configured to provide a tactile indication of the current state of control member 120. In other embodiments, control member 120 may be changeable between one or more other shapes configured to provide a tactile indication (e.g., identifiable condition or characteristic) of the current state.

Control member 120 may also be changeable to change a dimension of control member 120, such as a length, width, or height of control member 120 while maintaining the general shape of control member 120. The shape of control member 120 may be changed according to the dimension change. The shape may provide a tactile indication of the current state. In one embodiment, control member 120 is configured to maintain a particular overall shape (e.g., a cylindrical shape), but includes a changeable dimension configured to provide a tactile indication of the current state. For instance, a height of control member 120 may be increased or decreased (e.g., by controller 130) to provide an indication of the current state. The increase or decrease in height may move a surface of control member 120 (e.g., surface 202) closer to or further away from a user of system 100. The changeable dimension may also include a radius of control member 120 or any other dimension configured to provide a tactile indication of the state. In one embodiment, the overall shape of control member 120 indicates the subsystem of system 100 that is currently controllable (e.g., a top menu selection) and the changeable dimension indicates a parameter of the subsystem that is currently controllable (e.g., a lower menu selection) or the current value of a parameter (e.g., a status of the parameter, a system condition, etc.). For instance, the shape of control member 120 may indicate an audio system may be controlled (e.g., as a current top menu selection) and the changeable dimension may indicate a volume may be controlled (e.g., a current lower menu selection) or a current volume level (e.g., a parameter value).

The physical configuration of control member 120 may also be changeable to change a texture of a tactile surface (e.g., surfaces 202, 204) of control member 120. In one embodiment, control member 120 includes a surface having a changeable texture based on the variable state and intended to provide a tactile indication of the current state of control member 120. For instance, the texture of control member 120 may be changeable between a rough texture and a smooth texture in order to indicate a change in state of control member 120. The texture may also be changeable between a ridged texture, a grooved texture, and a smooth texture. The texture may also be changeable between a hard texture and a soft texture. In some embodiments, control member 120 includes a corner (e.g., intersection between surface 202 and surface 204) and the texture may be changeable between a sharp or angled corner and a rounded or dull corner. The changeable texture is configured to be easily identifiable by a user of system 100 in order to determine the current state without looking at control member 120 or control panel 110 (e.g., screen 112).

Referring now to FIGS. 5A-5H, the texture of control member 120 is changeable to include a surface feature (e.g., dimple, groove, notch, ridge, protrusion, indentation, etc.) based on the current state of control member 120. In FIGS. 5A-5H, examples of various surface features are shown, according to various embodiments. The surface features are provided on surface 202 in the illustrated embodiments, but the surface features may also be provided on surface 204 or on another surface of control member 120 in other embodiments. In FIG. 5A, surface 202 is substantially flat. In FIG. 5B, surface 202 includes ridges 210 (e.g., protrusions, bumps, projections, juts, knobs, etc.) separated by grooves 212 (e.g., gutters, channels, indentations, etc.). In FIG. 5C, surface 202 is crimped or corrugated, including a series of notches 214 across surface 202 intended to provide a rough tactile surface for the user of control member 120. In FIG. 5D, surface 202 includes notches 214 in an isolated area near a center portion of surface 202. Surface 202 is substantially flat in the area around notches 214 in this embodiment, such that notches 214 provide a contrasting tactile indication of a current state of control member 120. In FIG. 5E, surface 202 includes a single protrusion 216 (e.g., nodule, node, ridge, projection, etc.) positioned at a center portion of surface 202. In this embodiment of control member 120, surface 202 is substantially flat in the area surrounding protrusion 216. In FIG. 5F, surface 202 includes a single indentation 218 (e.g., dimple, channel, groove, etc.) positioned at a center portion of surface 202. In this embodiment, surface 202 is substantially flat in the area surrounding indentation 218. In FIG. 5G, surface 202 includes two protrusions 216 positioned opposite from each other on the outer edge of surface 202.

In FIG. 5H, surface 202 includes two sets of notches 214 positioned opposite from each other on the outer edge of surface 202.

The surface feature(s) may be configured (e.g., in the various configurations of FIGS. 5A-5H) to provide a tactile indication of the current state (i.e., the tactile indication may be based on the surface feature). For instance, a user of system 100 may be able to determine the current state of control member 120 based on whether ridge 210, notches 214, protrusion 216, and/or indentation 218 is present on a surface of control member 120. The surface feature(s) may be provided on a surface of control member 120 that is likely to be touched by the user. For instance, the surface feature(s) may be provided on a perimeter surface such as surface 204 in embodiments where control member 120 is turnable or otherwise graspable to provide inputs to control system 100. Likewise, the surface feature may be provided on a front surface such as surface 202 in embodiments where control member 120 is pressable or otherwise touchable to provide inputs to control system 100.

In one embodiment, the tactile indication includes or is based on a condition (e.g., count, spacing, orientation, etc.) of the surface feature(s). For instance, the surface feature(s) may be sized larger or smaller depending on the current state of control member 120. The surface feature(s) may have a particular shape and/or size based on the current state of control member 120. The shape and/or size of the surface feature(s) may provide the tactile indication of the current state. Control member 120 may also include a greater or lesser number of the surface feature(s) depending on the current state, such as having a particular count of protrusions 216 to indicate the state. In one embodiment, the type of surface feature(s) (e.g., ridge 210, groove 212, notch 214, etc.) indicate a subsystem of system 100 that is currently controllable by control member 120 (e.g., a top menu selection) and a condition of the surface feature(s) indicate a parameter of the subsystem that is currently controllable (e.g., a lower menu selection) or the current value of a parameter (e.g., a status of the parameter, a system condition, etc.). For instance, one or more protrusions 216 on a surface of control member 120 may indicate an audio system may be controlled by control member 120 (e.g., as a current top menu selection), and the number or count of protrusions 216 on the surface may indicate a volume may be controlled by control member 120 (e.g., as a current lower menu selection) or a current volume level (e.g., a parameter value, a condition status, etc.).

In one embodiment, a texture may be uniformly changeable over a surface of control member 120 (i.e., the texture is changeable but changes uniformly over the entire surface). For example, surfaces 202 and 204 may have uniformly changeable textures, but the textures of surfaces 202 and 204 may be substantially different at any time. In another embodiment, surfaces 202 and 204 have changeable textures but remain substantially similar to each other. The texture of control member 120 may also be changeable to change a portion or localized area of a surface of control member 120. For instance, control member 120 may be changeable to change the texture of a center or perimeter portion of a surface to provide the tactile indication of the variable state. In one embodiment, a center portion of surface 202 is changeable to a first texture (e.g., smooth, rough, etc.) and an adjacent perimeter portion of surface 202 is changeable to a second texture in order to provide a tactile indication of the variable state. In this embodiment, the second texture may be substantially different from the first texture to provide a tactile indication of the variable state. In one embodiment, the texture of the center portion (e.g., a first texture) provides a first tactile indication (e.g., which of the subsystems is currently controllable) and the texture of the perimeter portion (e.g., a second texture) provides a second tactile indication (e.g., which of the subsystem parameters is currently controllable). The texture may be changeable to include selectively located surface features on control member 120 based on the current state of control member 120. For instance, the user may be able to determine the current state of control member 120 based on the presence, count, and/or location of the surface features on control member 120. The surface features may be located or positioned on surface 202, surface 204, or in another location on control member 120 configured to be touched or contacted by the user.

Figure 6:
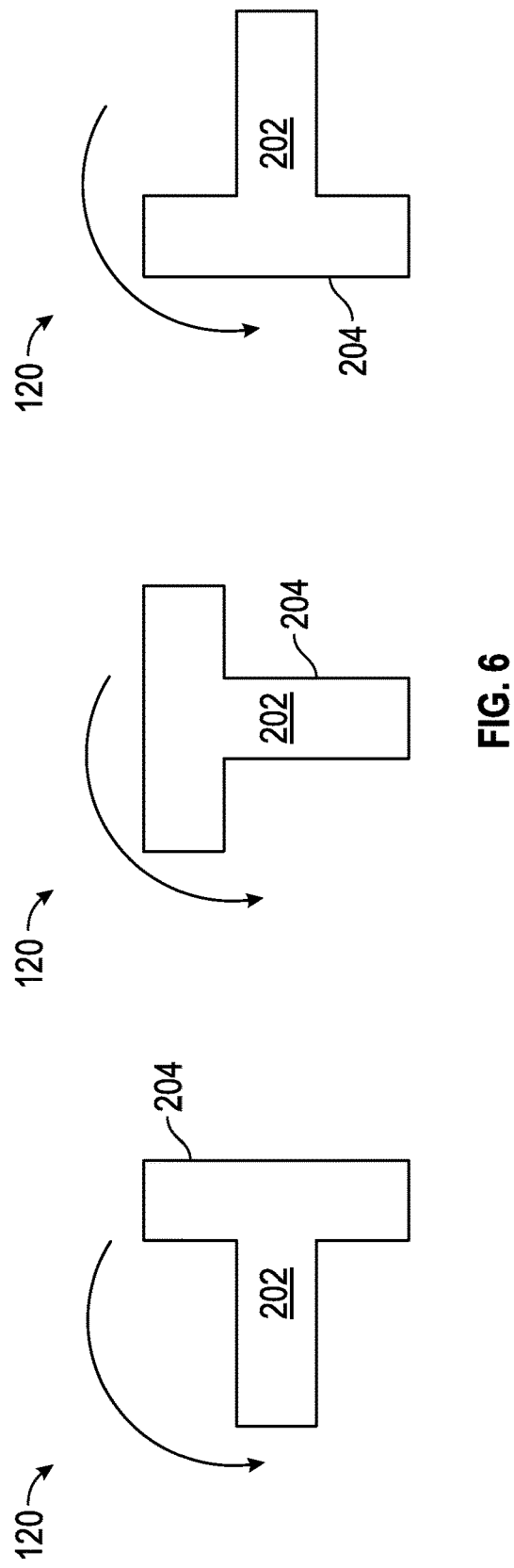
FIG. 6 is an illustration of a control member having a changeable orientation, according to one embodiment.

Referring now to FIG. 6, the physical configuration of control member 120 may also be changeable to change an orientation of control member 120. In one embodiment, control member 120 has a non-axially-symmetric shape, so that the orientation of control member 120 is tactilely identifiable by a user of control system 100. For instance, in the illustrated embodiment of FIG. 6, control member 120 has a graspable T-shape to enable a user to determine the orientation of control member 120 without looking at control member 120. In this embodiment, control member 120 may have a changeable or variable orientation. The changeable orientation may provide a tactile indication of the current state of control member 120. Control member 120 may be configured to rotate (e.g., counterclockwise, clockwise, etc.) or otherwise change its orientation based on the current state. The variable orientation of control member 120 may be independent of any manual manipulation of control member 120 by an operator. In some embodiments, at least a portion of control member 120 may also be manually rotated or otherwise manipulated by an operator to change a setting or value of a system parameter. For instance, control member 120 may be rotatable on a slide control to change the volume level in a vehicle audio system. In these embodiments, control member 120 may have a variable orientation based on the current state of control member 120, and may also be rotatable or similarly manipulatable to control one or more settings within the current control state.

In one embodiment, controller 130 causes control member 120 to rotate between two or more different orientations based on the variable state. Control member 120 may have a base orientation (e.g., base physical configuration) and be configured to return to the base orientation after control member 120 is manipulated. Control member 120 may also return to the base orientation when control system 100 is powered off or in a sleep or power-saving mode.

Although in some embodiments control member 120 may have a changeable orientation based on the variable state, the changeable orientation of control member 120 may be separate from other operations of control member 120. For instance, at least a portion of control member 120 may be rotatable or otherwise manipulatable by an operator to change a setting or value of a system parameter (e.g., rotating a knob to change a volume level). The changeable orientation of control member 120 may be distinct from a rotation that results from manual manipulation of control member 120 by the user. For instance, control member 120 may include a portion that is rotatable independent of the orientation of control member 120, such that a related setting may be changed by the user while maintaining the orientation of control member 120 to provide a desired tactile indication of the variable state.

The physical configuration of control member 120 may be changed discretely between two distinct physical configurations based on the current state. For instance, control member 120 may have a first physical configuration (e.g., a cylindrical shape) when control member 120 is in a first state and a second physical configuration (e.g., a square shape) when control member 120 is in a second state, only changing between the first physical configuration and the second physical configuration when the state is changed. The physical configuration may also be changed continuously or on a continuum of configurations between two distinct physical configurations based on the current state. For instance, control member 120 may gradually change between a first physical configuration and a second physical configuration based on the variable state. In one embodiment, control member 120 is configured to control a radio frequency and the physical configuration of control member 120 gradually changes between a convex shape and a concave shape as control member 120 is manipulated to adjust the radio frequency. In another embodiment, control member 120 is configured to control a stereo volume and control member 120 gradually changes between a cube shape and a cylinder shape as the volume is increased. In this embodiment, control member 120 is in a cube shape when the volume is at a minimum level and the corners of control member 120 dull as the volume is increased, such that control member 120 has a cylinder shape when the volume is at a maximum level. In further embodiments, other shapes of control member 120 can be used to indicate various states of control member 120.

Figure 7:
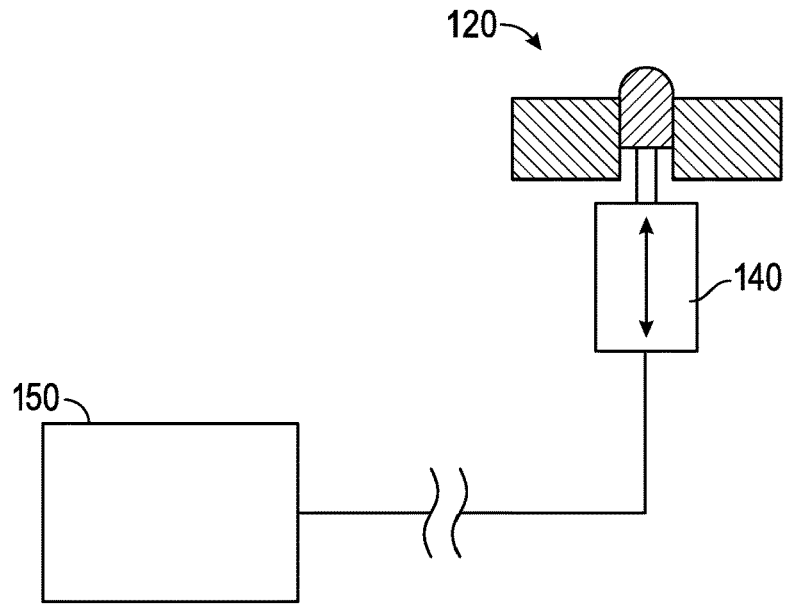
FIG. 7 is a block diagram of a control device, including a control member having a changeable physical configuration, according to one embodiment.

Referring now to FIG. 7, control device 700 is shown, according to one embodiment. Control device 700 includes control member 120, actuator 140, and transducer 150. In this embodiment, actuator 140 is shown as a hydraulic or pneumatic cylinder. Actuator 140 is coupled to control member 120 and configured to change a physical configuration of control member 120. In one embodiment, transducer 150 is coupled to control member 120 and configured to generate a signal based on the manual user input received via control member 120. Actuator 140 is configured to then receive the generated signal from transducer 150 and change the physical configuration of control member 120 based on the signal. For instance, in the illustrated embodiment, actuator 140 may actuate in response to the signal, causing control member 120 to have one or more protrusions or other surface features that are tactilely identifiable to the user. The user may then be able to determine a variable state of control member 120 (or control device 700) based on the tactilely identifiable physical configuration of control member 120.

In one embodiment, control member 120 includes a shape change component configured to change the physical configuration of control member 120 (e.g., shape, texture, etc.) in response to a stimulus (e.g., a pressure, a temperature, a moisture, a pH level, an electric field, a magnetic field, etc.). In this embodiment, actuator 140 may be or include a mechanism configured to provide the stimulus to the shape change component of control member 120 in order to change the physical configuration of control member 120 as desired. For instance, actuator 140 may include an electrical component and be configured to change the physical configuration of control member 120 by applying an electrical stimulus. In another embodiment, actuator 140 may include a shape change component configured to change the physical configuration of control member 120 in response to a stimulus. In this embodiment, the stimulus may be applied by actuator 140 or otherwise in response to a signal received from transducer 150.

The shape change component may include electroactive polymers (EAPs) (e.g., artificial muscle, electronic muscle, etc.) that are configured to exhibit a size and/or shape change when stimulated by an electric field. In one embodiment, actuator 140 may be configured to apply an electrical charge or current (e.g., electric field) to the shape change component (e.g., to the EAPs) to change a shape or otherwise change the physical configuration of control member 120. Actuator 140 may deliver the electrical charge or current via an electric motor or solenoid. Control member 120 may be selectively deformed by the electrical charge or current such that the physical configuration of control member 120 is changed. The electrical charge may be modulated in order to produce a desired size and shape of control member 120 (e.g., a circle or square, a concave or convex shape, etc.). The EAPs may include a dielectric EAP, wherein the physical change is caused by electrostatic forces between two electrodes which squeeze the polymer, a type of ionic polymer wherein the physical change is caused by displacement of ions within the polymer.

In one embodiment, control member 120 includes a deformable surface component (e.g., elastic cover) configured to cover at least a portion of control member 120, which may include the shape change component. The deformable surface component of control member 120 may be intended to flex or stretch with along with the shape change component of control member 120 in order to convey the size and/or shape change of control member 120.

Actuator 140 may also include a hydraulic component and be configured to change the physical configuration of control member 120 by hydraulic means. In one embodiment, actuator 140 is configured to selectively route pressurized fluid to one or more hydraulic components in order to change the physical configuration of control member 120. In this embodiment, control member 120 may include mechanical components that are moved in response to actuation of the hydraulic components of actuator 140. The mechanical components of control member 120 may be covered by the deformable surface component (i.e., a cover) in order to convey a changeable physical configuration of control member 120. Actuator 140 may include hydraulic components such as a hydraulic cylinder, valves, a pump, a return tank, etc., in order to control the mechanical components of control member 120. For instance, fluid may be routed to a hydraulic cylinder of actuator 140 in response to a signal received from transducer 150 (or controller 130 in another embodiment) and based on the current state of control member 120. Similarly, actuator 140 may include pneumatic components and be configured to selectively route pressurized air to move the mechanical components of control member 120 and change the physical configuration of control member 120.

The shape change component may also include a thermal component. In one embodiment, actuator 140 includes a thermal component configured to change the physical configuration of control member 120 by a transfer of thermal energy. In one embodiment, actuator 140 includes a shape change component that is responsive to temperature change, such as a temperature-responsive polymer. The temperature-responsive polymer may be configured to exhibit a change of its physical properties (e.g., size, shape, etc.) based on an applied temperature. In this embodiment, actuator 140 may be configured to apply heat to or cool the temperature-responsive polymer in order to change the shape of actuator 140 and thus change the physical configuration of control member 120. Actuator 140 may receive a signal from transducer 150 and heat or cool the temperature-responsive shape change component based on the signal. In other embodiments, control member 120 includes a temperature-responsive polymer and actuator 140 is configured to apply a thermal stimulus to control member 120 to change the physical configuration of control member 120.

Control member 120 may also be configured to change temperature in response to the stimulus, such that the temperature change is tactilely identifiable by the user. The user may be able to identify a variable state of control member 120 and/or control device 700 based on the temperature of control member 120. In another embodiment, the temperature change merely changes the physical configuration of control member 120 and is not otherwise sensed by the user. For instance, the deformable surface component of control member 120 may prevent the user from sensing the temperature change.

The shape change component may be otherwise configured in other embodiments. In one embodiment, the shape change component includes a material configured to change shape (e.g., bend, expand, contract, etc.) in response to an applied voltage (e.g., a piezoelectric material). Actuator 140 may be configured to selectively apply the required voltage to change the physical configuration of control member 120, such as in response to a signal received from transducer 150. In another embodiment, the shape change component may include a material configured to change shape in response to an applied magnetic field or a change in the applied magnetic field, such as a magnetostrictive material or magnetic shape memory alloy. In this embodiment, actuator 140 is configured to selectively apply a magnetic field to change the physical configuration of control member 120. In another embodiment, the shape change component includes is a pH-sensitive polymer or similar material configured to change the physical configuration of control member 120 in response to a change in pH. In this embodiment, actuator 140 is configured to selectively change the pH of the shape change component in order to change the physical configuration of control member 120. In another embodiment, the shape change component includes a material configured to change properties in response to light exposure (e.g., a photomechanical material). In other embodiments, the shape change component may be configured to change properties based on exposure to moisture, pressure, or another stimulus. Control member 120 may include a base physical configuration (e.g., a cylindrical shape) and be configured to return to the base physical configuration when the stimulus is removed.

Actuator 140 may also use any of the above methods or processes to change the texture of control member 120 as described above. For instance, actuator 140 may use hydraulic means to provide dimples or grooves on surface 202 and/or 204 in order to provide a tactile indication of the current state of control member 120. In one embodiment, actuator 140 is configured to change the texture of one or more surfaces of control member 120 in response to a physical touch from the user. Control member 120 may be configured to sense an applied force or otherwise sense the user touch, such as by sensing oil or other biological material from the user's skin. In one embodiment, transducer 150 is configured to interpret a touch from the user and generate a signal based on the touch. Transducer 150 may then cause actuator 140 to change the physical configuration of control member 120 by sending the signal to actuator 140, such that the physical configuration of control member 120 is changed based on the user touch.

Control member 120 may also provide a second indication of the current state of control member 120 to a user of control system 100 (in addition to the tactile indication). The second indication may tactile or non-tactile. Examples of tactile secondary indications include a vibration, temperature, texture, or shape. Examples of non-tactile secondary indications include a color change, light emission, or sound. The secondary indication is configured to be perceivable by the user of control system 100 or control device 700 in order to determine the variable state. In one embodiment, the first tactile indication provides an indication of a variable state, and the secondary indication provides an indication of a sub-state within the variable state. For instance, the tactile indication may indicate to the user that an audio system is currently controllable and the secondary indication may indicate to the user that a volume level of the audio system is currently controllable.

The secondary indication may also be provided by the changeable physical configuration of control member 120. For instance, the first tactile indication may be based on an identifiable three-dimensional shape of control member 120 and the secondary indication may be a size of the shape or a texture of a surface of control member 120. The secondary indication may also be unrelated to the changeable physical configuration of control member 120, such as being based on a non-tactile variable condition (e.g., color, brightness, an emitted sound, etc.) of control member 120. For instance, control member 120 may be configured to emit a light or noise as a secondary indication while the physical configuration of control member 120 remains static in order to indicate the variable state of control member 120. In one embodiment, control member 120 includes a material configured to change color in response to a stimulus (e.g., a halochromic material, a chromogenic material, etc.), such that the changeable color provides the secondary indication. In this embodiment, actuator 140 may be configured to apply a stimulus to the color-changing material in order to change the color of control member 120 and provide the secondary indication to the user.

In one embodiment, the variable state of control member 120 is related to a top-level menu or function selection, such as which of a plurality of subsystems is currently controllable. For instance, the variable state may determine whether a vehicle control system is currently configured to control an audio system, a heating and cooling system, a telephone system, a navigation system, a communications system, an emergency response system, or another system within the vehicle. In this embodiment, the tactile indication provided by the physical configuration of control member 120 is intended to indicate which of the vehicle systems may be controlled by manipulating control member 120 (i.e., the variable state of control system 100). The variable state may also be related to one or more lower level menu or function selections (e.g., parameters). For instance, the variable state may determine which of a plurality of parameters within a particular subsystem is currently controllable by manipulating control member 120. In one embodiment, the tactile indication may also indicate which of the parameters is currently controllable via control member 120. In another embodiment, the secondary indication indicates to the user which of the parameters within a subsystem of control system 100 or control device 700 are controllable via control member 120.

In one embodiment, a non-control component of control device 700 or control system 100 is configured to provide a tactile indication of the variable state of control member 120 and/or control system 100. For instance, a steering wheel segment or arm rest within a vehicle may be configured to provide the tactile indication. In this embodiment, the component may have a changeable physical configuration. The physical configuration of the component may be changeable as described above.

Referring again to FIG. 1, controller 130 may be used to control one or more components of system 100 (e.g., control member 120, actuator 140, transducer 150 control panel 110, etc.), as well as to perform any calculations, functions or processes of system 100 described herein. Controller 130 may be a component of system 100 or an independent component configured to wirelessly control system 100 or control device 700. Controller 130 includes memory 134 and processor 132. Memory 134 stores programming instructions that, when executed by processor 132, control the operations of system 100, including changing the physical configuration of control member 120, such as by controlling actuator 140. In one embodiment, processor 132 is included as part of a processing circuit also including memory 134. Processor 132 may be implemented as a general-purpose processor, an application specific integrated circuit (ASIC), one or more field programmable gate arrays (FPGAs), a digital-signal-processor (DSP), a group of processing components, or other suitable electronic processing components. Memory 134 is one or more devices (e.g., RAM, ROM, Flash Memory, hard disk storage, etc.) for storing data and/or computer code for facilitating the various processes described herein. Memory 134 may be or include non-transient volatile memory or non-volatile memory. Memory 134 may include database components, object code components, script components, or any other type of information structure for supporting the various activities and information structures described herein. Memory 134 may be communicably connected to processor 132 and provide computer code or instructions to processor 132 for executing the processes described herein.

Controller 130 is in electrical communication with various components of system 100 such as control panel 110, which may include controls such as control member 120 as well as screen 112. Controller 130 may be physically connected to each of the components of system 100 or controller 130 may be connected to one or more of the components of system 100 by a remote (e.g., wireless) connection.

In one embodiment, controller 130 is programmed or otherwise configured to receive input via control member 120 and/or other controls of system 100 and send commands or signals to various components of system 100 based on the input. Controller 130 is configured to control the variable state of control member 120 based on the input, as well as one or more conditions of control system 100 and/or an environment controlled by control system 100. Controller 130 is also configured to control the physical configuration of control member 120 based on the manual user input at control member 120 and/or based on the variable state. Controller 130 may also be configured to control a physical configuration of one or more other controls associated with control system 100. Controller 130 may also be configured to communicate with any other components of system 100 and/or device 700 and perform any functions described herein related to system 100 and/or device 700. In one embodiment, controller 130 is programmed to store or record any data associated with system 100 and/or device 700, any signals or commands sent or received, or any other information related to system 100 and/or device 700 within memory 134 to be available for upload.

Controller 130 receives operational electrical power from a power supply. In one embodiment, the power supply provides power to controller 130 and all components of system 100 and/or device 700, which may include control panel 110. The power supply may be any suitable power source, including, but not limited to, a solar power source, grid power, a battery, or a combination thereof. In arrangements where the power supply includes a rechargeable battery, the battery may be charged during operation through another power source (e.g., a solar panel, etc.).

Control member 120 is not dependent on the presence of controller 130 (or another control module) in order to change physical configuration. In other embodiments, the physical configuration of control member 120 may be changeable independent of controller 130. For instance, the variable state or mode may be controlled by a rotary switch or other mechanical device. The rotary switch may be actuated to change the physical configuration of control member 120 when the variable state is changed or as is otherwise desired according to the particular configuration of control member 120. In other embodiments, such as is shown in FIG. 7, the physical configuration of control member 120 may be changed based on signals received from a transducer such as transducer 150.

Figure 8:
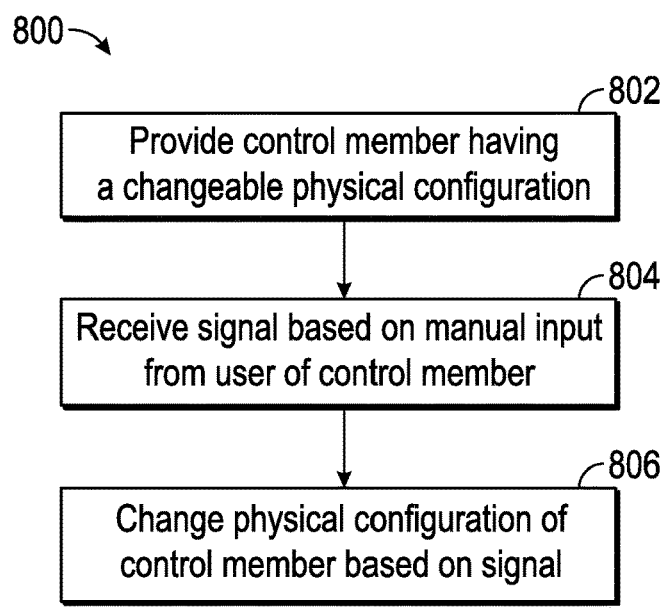
FIG. 8 is a flow chart diagram for a process for providing a tactile indication of a variable state of a control member, according to one embodiment.

Referring now to FIG. 8, process 800 is shown for providing a tactile indication of a variable state of a control device, according to one embodiment. At 802, a control member (e.g., control member 120) having a plurality of physical configurations is provided. Control member 120 may be configured to receive manual input from a user. At 804, a signal based on the manual input from the user is received, such as by a controller (e.g., controller 130). At 806, the physical configuration of control member 120 is changed (e.g., using controller 130, using actuator 140, etc.) based on the signal. The physical configuration of control member 120 may provide a tactile indication of the variable state associated with control member 120 to the user.

The construction and arrangement of the apparatus, systems and methods as shown in the various embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, some elements shown as integrally formed may be constructed from multiple parts or elements, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the described embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another. Such joining may be communicative, rather than physical.

Although the figures may show or the description may provide a specific order of method steps, the order of the steps may differ from what is depicted. Also two or more steps may be performed concurrently or with partial concurrence. Such variation will depend on various factors, including software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for providing a tactile indication of a variable state of a control member, the method comprising:
   providing a control member having a plurality of physical configurations and being configured to receive manual input from a user;
   receiving, by a controller, a signal based on the manual input; and
   changing, by the controller, the physical configuration of the control member based on the signal, wherein the physical configuration of the control member provides a tactile indication of the variable state associated with the control member; and
   wherein the variable state is based on a current device or a current system that is separate from the control member and is configured to be modified by the control member.

2. The method of claim 1, further comprising:
   controlling, by the controller, the variable state based on the signal, wherein the physical configuration of the control member is changed according to the variable state.

3. The method of claim 1, further comprising:
   providing a control system comprising the control member and the controller.

4. The method of claim 1, wherein the control member includes at least one of a knob, a lever handle, a handgrip, a joystick, and a computer mouse.

5. The method of claim 1, wherein the tactile indication is static.

6. The method of claim 1, wherein the physical configurations include two or more three-dimensional shapes.

7. The method of claim 1, wherein the control member includes a surface, and wherein the controller is configured to change the physical configuration of the control member by changing the shape of the surface between a plurality of surface shapes.

8. The method of claim 1, wherein the controller is configured to control a dimension of the control member based on the manual input, wherein the dimension is configured to provide the tactile indication of the current variable state.

9. The method of claim 1, wherein the plurality of physical configurations includes a continuum of physical configurations between two or more distinct physical configurations, wherein each of the continuum of physical configurations is a combination of the two or more distinct physical configurations.

10. The method of claim 1, wherein the plurality of physical configurations is discrete.

11. The method of claim 1, wherein the physical configuration of the control member is changed via an actuator coupled to the control member and the controller and configured to change the physical configuration of the control member in response to a stimulus.

12. The method of claim 1, wherein the control member includes a deformable surface component configured to convey the physical configuration of the control member.

13. The method of claim 1, further comprising:
   controlling, by the controller, the control member to provide a secondary indication of the current variable state.

14. The method of claim 1, wherein the control member has a changeable orientation.

15. A control system, comprising:
   a graspable control member having a plurality of physical configurations and being configured to receive manual input from a user; and
   a controller coupled to the control member and configured to control the physical configuration of the control member based on the manual input from the user, wherein the physical configuration of the control member is configured to provide a tactile indication of a current state of the control system;
   wherein the current state is based on a current device or a current system that is separate from the control member and is configured to be modified by the control member.

16. The control system of claim 15, wherein the controller is configured to control the current state of the control system, and wherein the physical configuration of the control member is changed according to the current state.

17. The control system of claim 15, wherein the control member includes at least one of a knob, a lever handle, a handgrip, a joystick, and a computer mouse.

18. The control system of claim 15, wherein the tactile indication is static.

19. The control system of claim 15, wherein the physical configurations include two or more three-dimensional shapes.

20. The control system of claim 15, wherein the control member includes a surface, and wherein the controller is configured to change the physical configuration of the control member by changing the shape of the surface between a plurality of surface shapes.

21. The control system of claim 15, wherein the controller is configured to control a dimension of the control member based on the manual input, and wherein the dimension is configured to provide the tactile indication of the current state.

22. The control system of claim 15, wherein the plurality of physical configurations includes a continuum of physical configurations between two or more distinct physical configurations, wherein each of the continuum of physical configurations is a combination of the two or more distinct physical configurations.

23. The control system of claim 15, wherein the plurality of physical configurations is discrete.

24. The control system of claim 15, wherein the physical configuration of the control member is changed via an actuator coupled to the control member and the controller is configured to change the physical configuration of the control member in response to a stimulus.

25. The control system of claim 15, wherein the control member includes a deformable surface component configured to convey the physical configuration of the control member.

26. The control system of claim 15, wherein the controller is configured to control the control member to provide a secondary indication of the current state.

27. The control system of claim 15, wherein the control member has a changeable orientation.

28. A control system, comprising:
- a graspable control member having a plurality of physical configurations and being configured to receive manual input from a user; and
- a controller coupled to the control member and configured to control the physical configuration of the control member based on the manual input from the user, wherein the physical configuration of the control member is configured to provide a tactile indication of a current varaiable state of the control system;
- wherein the physical configuration remains static absent further manual input from the user; and
- wherein the current variable state is based on a current device or a current system that is separate from the control member and is configured to be modified by the control member.

* * * * *